United States Patent [19]
Donovan et al.

[11] Patent Number: 5,573,844
[45] Date of Patent: Nov. 12, 1996

[54] CONFORMABLE SURFACE FINISHING ARTICLE AND METHOD FOR MANUFACTURE OF SAME

[75] Inventors: Mary B. Donovan, St. Paul; Timothy J. Pleggenkuhle, Maplewood, both of Minn.

[73] Assignee: Minnesota Mining and Manufacturing Company, St. Paul, Minn.

[21] Appl. No.: 369,933

[22] Filed: Jan. 6, 1995

[51] Int. Cl.⁶ ........................................ B32B 5/16
[52] U.S. Cl. .................. 428/240; 51/295; 428/233; 428/246; 428/252; 428/253; 428/283; 428/284; 427/209; 427/211; 427/389.9
[58] Field of Search ........................... 428/283, 284, 428/246, 252, 253, 233, 240; 51/295; 427/209, 211, 389.9

[56] References Cited

U.S. PATENT DOCUMENTS

| | | |
|---|---|---|
| Re. 32,978 | 7/1989 | Demetriades . |
| 1,519,577 | 12/1924 | Easton, Jr. ............................ 15/209 |
| 2,059,132 | 10/1936 | McDermott ............................. 28/4 |
| 2,308,405 | 1/1943 | Tully ..................................... 15/209 |
| 2,958,593 | 11/1960 | Hoover et al. ........................ 51/295 |
| 3,075,222 | 1/1963 | Miller ................................... 15/209 |
| 3,080,688 | 3/1963 | Politzer ................................ 51/185 |
| 3,112,584 | 12/1963 | Cameron .............................. 51/185 |
| 3,280,517 | 10/1966 | Copeland ............................. 51/400 |
| 3,307,990 | 3/1967 | Homier et al. ....................... 156/72 |
| 3,324,609 | 6/1967 | Stein et al. . |
| 3,342,533 | 9/1967 | Engel et al. .......................... 300/21 |
| 3,476,626 | 11/1969 | Charton, Jr. et al. ................ 156/148 |
| 3,532,588 | 10/1970 | Newman ............................. 161/148 |
| 3,562,968 | 2/1971 | Johnson et al. ..................... 51/389 |
| 3,688,453 | 9/1972 | Legacy et al. ....................... 51/400 |
| 3,862,522 | 1/1975 | Mednick .............................. 51/400 |
| 3,937,861 | 2/1976 | Zuckerman et al. .............. 428/235 |
| 3,956,560 | 5/1976 | Smith, II ........................... 428/218 |
| 3,976,525 | 8/1976 | Mednick ............................. 156/72 |
| 4,227,350 | 10/1980 | Fitzer ................................ 51/295 |
| 4,331,453 | 5/1982 | Dau et al. ........................... 51/298 |
| 4,609,581 | 9/1986 | Ott ................................... 428/100 |
| 4,652,275 | 3/1987 | Bloecher et al. ................... 51/298 |
| 4,799,939 | 1/1989 | Bloecher et al. ................... 51/293 |
| 4,841,684 | 6/1989 | Hall, Jr. ............................. 51/400 |
| 5,382,461 | 1/1995 | Wu ..................................... 428/86 |
| 5,482,756 | 1/1996 | Berger ............................. 428/36.2 |

FOREIGN PATENT DOCUMENTS

| | | |
|---|---|---|
| 1562843 | 3/1969 | France . |
| 2353690A1 | 5/1975 | Germany ..................... B32B 5/24 |
| A2051736 | 4/1992 | Netherlands . |

OTHER PUBLICATIONS

PCT International Search Report for International Application No. PCT/US95/15096.
Kirk–Othmer, *Encyclopedia of Chemical Technology*, Third Edition, John Wiley & Sons, 1982, New York, vol. 17, pp. 384–399.

Primary Examiner—James J. Bell
Attorney, Agent, or Firm—Gary L. Griswold; Walter N. Kirn; Daniel R. Pastirik

[57] ABSTRACT

Conformable surface finishing articles and a method for the manufacture of such articles are provided. The articles comprise a nonwoven three dimensional lofty web of fibers, a stretch resistant porous reinforcing fabric having first and second major surfaces with the first major surface disposed along a major surface of the web, and a layer comprising a polymer coated over and coextensive with the second major surface of the reinforcing fabric and having a flexible low friction exposed surface and portions extending through the reinforcing fabric encapsulating fibers along the major surface of the web. The method comprises positioning a stretch resistant porous reinforcing fabric adjacent a major surface of a nonwoven three dimensional lofty web of fibers, applying a coatable composition so that a portion of the composition extends through the fabric to contact and encapsulate fibers along the major surface of the web while also forming a substantially smooth exposed surface coated over and coextensive with the fabric, and hardening the composition.

27 Claims, 1 Drawing Sheet

CONFORMABLE SURFACE FINISHING ARTICLE AND METHOD FOR MANUFACTURE OF SAME

This invention relates to a conformable surface finishing article comprising a fabric-reinforced three-dimensional nonwoven web and to a method for the manufacture of such an article.

BACKGROUND OF THE INVENTION

Conformable, nonwoven three-dimensional fibrous surface finishing articles are known to remove corrosion, surface defects, burrs, and the like as well as to impart desirable surface finishes on various articles of aluminum, brass, copper, steel, and wood, for example. Such articles include discs, endless belts and pads made according to the teachings of U.S. Pat. No. 2,958,593 issued to Hoover et al. Such nonwoven surface finishing articles have not been entirely satisfactory because they can get snagged on sharp edges or stretch and break when in the form of endless belts. It is desirable, therefore, to develop surface finishing articles comprising nonwoven portions which are strong and resistant to stretching and snagging during use.

Efforts to reinforce nonwoven surface finishing products have included needle tacking the three-dimensional web, affixing the web to a woven support backing or a combination thereof. The resulting articles, although widely used, have also been less than satisfactory in some applications. Needle tacking of the nonwoven web, for example, produces densified areas which take on abrasive/binder coatings at higher loadings than other areas within the web. These densifted areas form harder, more aggressive abrasive surfaces which may scratch the workpiece in subsequent surface finishing applications. Additionally, woven support backings often lack sufficient conformability to match the contours on many surfaces, resulting in "edge cuts" where the edge of the moving belt aggressively cuts into the contoured areas of the workpiece. Finishing operations such as the final finishing of fine furniture, musical instruments, or performance articles such as skis, for example, are exemplary of surface finishing operations requiring improved surface finishing articles. Accordingly, there is a need for a nonwoven surface finishing article which is resistant to snagging, stretching and/or breaking during use while being flexible and conformable for use on contoured surfaces. Preferably, the nonwoven web in such an article would not include densified abrasive areas.

Other efforts to provide suitable nonwoven surface finishing articles have used an open mesh cloth to reinforce the nonwoven web. Frequently, the web is needle tacked and the needled fibers of the web project through the cloth. Such stretch resistant nonwoven surface finishing belts show improvements in snag resistance and in some uses on contoured surfaces where the belt is supported against the workpiece by a contact wheel. However, in applications where a stationary platen is urged against the belt, excessive friction between the platen and the nonwoven needled fibers protruding through the woven cloth generates significant heat which can abrade the platen during the operation. Moreover, the roughness of the nonabrasive surface of such belts can prevent the application of a uniform pressure by the platen and thereby prevent the smooth running of the belt over the workpiece. Therefore, a need exists for a surface finishing article suitable for use on contoured surfaces and which can be operated by use of a stationary platen to provide a consistent finish on the workpiece and without excessive wear of the platen. It would be desirable to provide such an article with a backing which provides a smooth, low-friction surface and wherein the nonwoven web lacks densified abrasive areas.

BRIEF DESCRIPTION OF THE INVENTION

The invention provides conformable nonwoven surface finishing articles and a method for the manufacture of such articles. The articles of the invention include abrasive and polishing belts, pads, discs, and the like which include a low friction surface suitable in belt applications where a platen urges the article against a workpiece.

In one aspect of the invention, a surface finishing article is provided comprising a nonwoven three dimensional lofty web of fibers having at least one major surface, said fibers bonded to one another at their mutual contact points; a stretch resistant porous reinforcing fabric having first and second major surfaces, said first major surface of said fabric disposed on and along said one major surface of said nonwoven web; a layer comprising a flexible polymer coated over and coextensive with said second major surface of said fabric, said layer having a low friction exposed surface and portions extending through said reinforcing fabric encapsulating fibers along said one major surface of said web.

In describing the details of the invention, certain terms will be understood to have the specific meanings set forth herein. "Hardenable coatable composition" or "coatable composition" refers to a viscous composition comprising a polymer or components which will react to form a polymer, and which will harden to a solid polymer layer which remains solid at ambient conditions as well as at the working conditions for the surface finishing article. "Low friction surface" refers to a polymer surface in a surface finishing article which, when a platen is urged against the surface, provides a lower coefficient of friction than the same type of surface finishing article without such a polymer surface. "Surface finishing article" refers to any endless belt, disc, pad or similar article comprising a nonwoven three dimensional web of fibers which is useful in abrasive or finishing operations on wood, metal, plastic or other surfaces. "Stretch value" refers to the amount in which a fabric is stretched in one direction when subjected to 17,500 Newtons stress per linear meter of width. The stretch value is calculated as [(stretched measurement-initial measurement)/(initial measurement)]×100.

In another aspect of the invention, a method for the manufacture of the foregoing surface treating articles is provided which comprises positioning a porous stretch resistant reinforcing fabric having first and second major surfaces adjacent one major surface of a nonwoven three dimensional lofty web of fibers such that said first major surface of said fabric substantially covers said one major surface of said web; applying a coatable composition so that a portion of said composition extends through said fabric to contact and encapsulate fibers along said one major surface of said web adjacent said first major surface of said fabric while forming an exposed surface coextensive with said second major surface of said fabric; and, hardening said coatable composition to provide said surface finishing article.

Preferably, the nonwoven web is not needle tacked. The preferred reinforcing fabric is a woven stretch-resistant material comprising plain weave fabrics having openings between the warp and fill yarns of at least about 0.10 mm$^2$. In general, the reinforcing fabric will comprise a woven material with sufficiently large openings therein to allow portions of the polymer layer to extend therethrough and form discrete bonding portions with fibers along a major surface of the nonwoven web. The actual dimensions of the openings can be varied depending on the type of polymer used and the temperature at which it is applied to the fabric.

The preferred polymer is a melt extrudable thermoplastic material. Most preferably, the polymer is nylon 6. The polymer is applied as a hardenable coatable composition, and typically a molten polymer. With the application of pressure, the coatable composition will be forced through the openings in the fabric to encapsulate fibers along a major surface of the web while also forming a low friction exposed surface coating over and coextensive with the outer surface of the fabric. This surface may be planar, dimpled or otherwise textured as may be required.

Those skilled in the art will better understand the details of the present invention upon further consideration of the remainder of the disclosure, including the drawings, the detailed description of the preferred embodiment and the appended claims.

BRIEF DESCRIPTION OF THE DRAWINGS

In describing the structures of the preferred embodiments of the present invention, reference will be made to the various drawings wherein.

DETAILED DESCRIPTION OF THE PREFERRED EMBODIMENT

Figure 1:
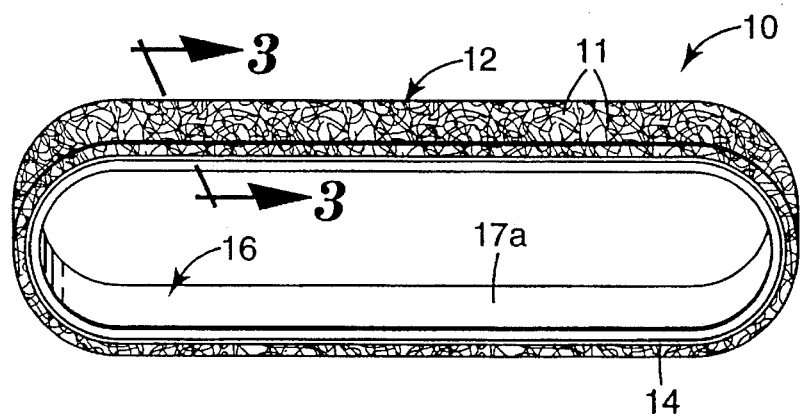
FIG. 1 is a perspective view of a surface finishing belt according to the present invention.

A conformable surface finishing article is provided in any of various forms such as endless belts, discs, pads, and the like. The articles of the invention comprise a nonwoven surface finishing web secured to a stretch-resistant reinforcing fabric by a polymer coating which provides a low-friction surface suitable for the application of a platen thereto. Portions of the polymer coating extend through the fabric layer to form discrete bonding areas with fibers of the web, thereby bonding the polymer, the fabric and the nonwoven web into a unitary finishing article. In discussing the details of the preferred embodiments, reference is made to the various figures wherein structural features are referred to using reference numerals and wherein like reference numerals indicate like structures.

Figure 3:
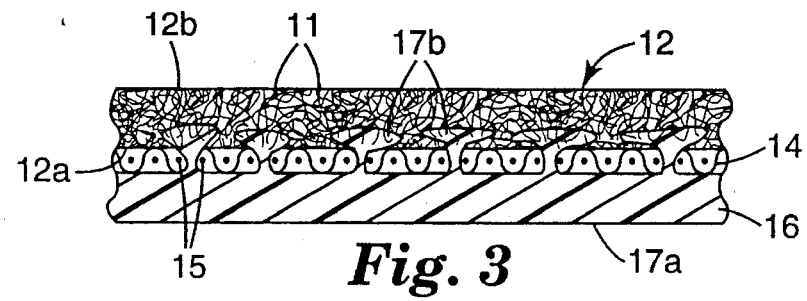
FIG. 3 is an enlarged sectional view of a segment of the surface finishing belt of FIG. 1 taken at line 3—3 of FIG. 1.

Referring generally to the figures, the surface finishing article of the invention in the form of an endless belt 10 (FIG. 1) is shown. A three-dimensional nonwoven web 12 and a woven stretch-resistant reinforcing fabric 14 are components of the belt 10. The nonwoven web 12 includes an inner or first major surface 12a and an outer or second major surface 12b with the second surface 12b being the working surface of the belt 10 (see FIG. 3). The reinforcing fabric 14 preferably comprises a woven material having a plurality of openings therethrough (generally indicated at 15). Fabric 14 is applied against the first surface 12a of the nonwoven layer 12. A flexible polymer layer 16 extends over and is coextensive with a major surface of the fabric 14 forming exposed surface 17a and providing a drive surface of belt 10 which in use would be carried on drive rollers and supported therebetween on a platen of a surface finishing machine (not shown). Exposed surface 17a is preferably a low friction surface to avoid heat buildup between it and the surface of the platen. Portions 17b (FIG. 3) of the polymer layer 16 extend through openings in the fabric 14 to form discrete bonding areas with fibers 11 along the first major surface 12a of nonwoven layer 12.

Figure 2:
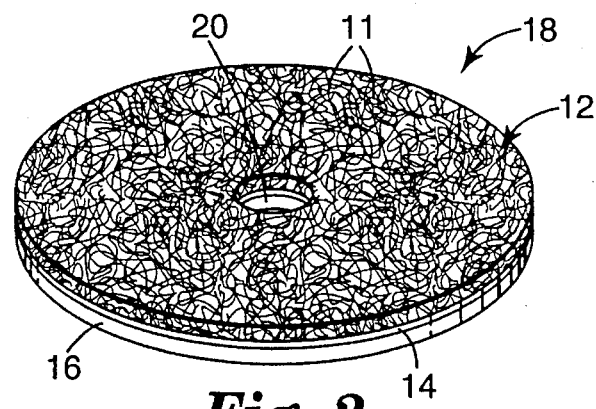
FIG. 2 is a perspective view of a surface finishing disc in accordance with the present invention.

The articles of the present invention can also be provided in the form of discs such as disc 18 shown in FIG. 2. Disc 18 may include a central opening 20 to facilitate mounting. Except for its converted external shape, the internal structure of the disc 18 is identical to that of belt 10 of FIG. 1 including a nonwoven layer 12, a woven material 14, and a polymeric material 16, as described above. Surface finishing articles of the invention also comprise surface finishing pads (not shown) having the above-described feature which may be cut or converted into any of a variety of shapes, e.g., rectangular, square, circular, oval, etc. All such surface finishing articles having the described features will be understood as within the scope of the present invention. Further details of the components of the surface finishing articles of the invention are provided below.

The Nonwoven Web

The nonwoven web comprises a lofty, open, low-density, fibrous, nonwoven web made of suitable synthetic fiber such as nylon, polyester, and the like. The web preferably is capable of withstanding the temperatures at which impregnating resins and adhesive binders are cured without deterioration. The fibers of the web are preferably tensilized and crimped but may also be continuous filaments formed by a spunbond process such as that described in U.S. Pat. No. 4,227,350 to Fitzer, for example. Fibers which are satisfactory for use in the nonwoven web are between about 20 and about 100 millimeters and preferably between about 40 and about 65 millimeters in length and have a denier ranging from about 1.5 to about 500 and, preferably, from about 15 to about 100. It is contemplated that fibers of mixed dehier can be used in the manufacture of a nonwoven portion 12 in order to obtain a desired surface finish. The use of larger fibers is also contemplated to permit the inclusion of larger abrasive particles within the articles of the invention. Those skilled in the art will understand that the invention is not limited by the nature of the fibers employed or by their respective lengths, denier and the like.

The nonwoven web is readily formed on a "Rando webber" machine (commercially available from Rando Machine Company, New York) or may be formed, by other conventional carding processes. Where a spunbond-type nonwoven material is employed, the filaments may be of substantially larger diameter, for example, up to 2 millimeters or more in diameter. The use of larger-diameter fibers permits the employment of larger abrasive particles in the finished article. Useful nonwoven webs preferably have a weight per unit area at least about 100 g/m$^2$, and more preferably about 250 g/m$^2$. Lesser amounts of fiber within the nonwoven web will provide articles having somewhat shorter commercial work lives. The foregoing fiber weights typically will provide a web, before needling or impregnation, having a thickness from about 6 to about 75 millimeters, and preferably about 25 millimeters. Commercially available nonwoven webs suitable for use in the invention include those identified in the Examples below.

The nonwoven web 12 may optionally be further reinforced and consolidated by needle tacking, a treatment which mechanically strengthens the nonwoven web by passing barbed needles therethrough. During this treatment, the needles pull the fibers of the web with them while they pass through the nonwoven web so that, after the needle has retracted, individual collections of fibers of the web are oriented in the thickness direction of the nonwoven fabric. The amount or degree of needle tacking may include the use of about 8 to about 20 needle penetrations per square centimeter of web surface when 15×18×25×3.5 RB, F20 6-32-5.5B/3B/2E/L90 needles (commercially available for Foster Needle Company, Manitowoc, Wis.) are used. Needle tacking is readily accomplished by use of a conventional needle loom which is commercially available from, for example, Dilo, Inc. of Charlotte, N.C.

Following the optional needle tacking step, the nonwoven web is impregnated either with a resin-abrasive slurry or a resin binder (e.g., without abrasive particles) depending upon the required aggressiveness of the finished article. The nonwoven web is thoroughly saturated with the resin-abrasive slurry or the resin binder using any of a number of conventional application techniques, such as spray coating, dip-coating, or roll coating using a two-roll coater, for example. The preferred resins for use in coating the nonwoven web are those which, upon curing, will be relatively hard and which will provide firm bonding of the constituent fibers to one another. Exemplary of resins that are useful in the present invention include phenolic resins, aminoplast resins having pendant $\alpha$, $\beta$-unsaturated carbonyl groups, urethane resins, epoxy resins, ethylenically unsaturated resins, acrylated isocyanurate resins, urea-formaldehyde resins, isocyanurate resins, acrylated urethane resins, acrylated epoxy resins, bismaleimide resins, fluorine-modified epoxy resins, and combinations thereof. Catalyst and/or curing agents may be added to the binder precursor to initiate and/or eliminate polymerization. Preferably, the binders used in the present invention are phenolic resins such as resole and novolac resins, described in Kirk-Othmer, *Encyclopedia of Chemical Technology,* Third Edition, John Wiley and Sons, 1981, New York, Volume 17, pages 384–399, incorporated by reference herein. Resole phenolic resins are made from an alkaline catalyst and a molar excess of formaldehyde, typically having a molar ratio of formaldehyde to phenol between about 1.0:1.0 and 3.0:1.0. Novolac resins are prepared under acid catalysis and with a molar ratio of formaldehyde to phenol less than 1.0:1.0. Commercially available phenolic resins suitable for use in the present invention include those known under the trade designations "Durez" and "Varcum," available from Occidental Chemicals Corporation (N Tonawanda, N.Y.); "Resinox," available from Monsanto Corporation; and "Arofene" and "Arotap," both available from Ashland Chemical Company.

The first and/or the second surfaces 12a and 12b, respectively, of the nonwoven web 12 are coated with the aforementioned resin binder which may also include optional abrasive particles. Abrasive particles can also be applied in a separate step after the application of the resin binder to the web 12. Abrasive particles suitable for use herein are preferably of 24 grade or finer, such as those normally used for finishing operations. Suitable abrasive particles include aluminum oxide including ceramic aluminum oxide, heat-treated aluminum oxide and white-fused aluminum oxide; silicone carbide, alumina zirconia, diamond, ceria, cubic boron nitride, garnet, flint, emery and combinations of the foregoing. Additionally, abrasive agglomerates can be used such as those described in U.S. Pat. Nos. 4,652,275 and 4,799,939, the disclosures of which are incorporated herein by reference.

Abrasive mineral-coated belts satisfactory for use in article finishing typically should have a nonwoven surface having a shore A ($H_A$) Durometer, according to ASTM test method D2240-86, of about less than 10 to about 85 as measured with a 5 millimeter diameter "A" instrument foot. Although an $H_A$ value lower than 10 is considered to be out of the range of ASTM D2240, readings of about 5 have been measured on the softer articles of the invention. A lower Durometer measurement typically results in a belt which is easily snagged and torn by sharp corners of the workpieces, for example. Articles of higher durometer measurements are excessively dense and will frequently load up with pieces of abradant. Where the article is to be used in polishing applications, the nonwoven web 12 usually will not include abrasive particles but may include less abrasive minerals such as talc, for example.

The Reinforcing Fabric

The reinforcing fabric 14 is preferably a woven stretch-resistant fabric with a low-stretch value when pulled in opposing directions. A stretch value of less than about 20% is preferred and a value of less than about 15% is more preferred. Suitable materials for use as the reinforcing fabric in the articles of the invention include, without limitation, thermobonded fabrics, knitted fabrics, stitch-bonded fabrics and the like. Those skilled in the art will appreciate that the invention is not to be limited to the selection of one reinforcing fabric over another, and it is contemplated that the invention will include any type of material which otherwise has the requisite properties as set forth herein.

One aspect of the present development is the use of a reinforcing fabric comprising a woven material with sufficiently large openings therein to allow portions of the polymer layer to extend therethrough, forming discrete bonding portions 17b with fibers of the nonwoven web 12 along the first major surface 12a. The actual dimensions of the openings can be varied depending on the type of polymer used and the temperature at which it is applied to the fabric. Where nylon 6 is used, the reinforcing fabric will preferably comprise plain weave fabrics having openings between the warp and fill yarns of about 0.10 mm². A plain weave fabric having 16 warp yarns and 16 fill yarns per inch (e.g., 16×16) of 840 denier nylon 6,6 yarns having a fabric weight of 149 g/m² (4.4 oz./yd²) is most preferred for use with a nylon 6 polymer. Such a material is commercially available from Highland Industries of Greensboro, N.C.

Other materials may be used such as those made of polyester, cotton, animal hair, other polyamides, and the like. Preferably, at least one layer of woven stretch resistant reinforcing fabric 14 is included within the articles 10 and 12 of the invention. Additional layers of fabric (not shown) may be used in addition to the first woven fabric layer 14 to provide additional dimensional strength as long as the openings in the woven fabrics are at least partially aligned so as not to substantially impede the extrusion of the polymer through the two fabric layers and into the nonwoven layer 12. Where two or more fabric layers are included, they are preferably positioned adjacent one another in the finished article.

The Polymer Layer

The polymer layer 16 encapsulates the woven, stretch-resistant reinforcing fabric 14. Preferably, the polymer is applied as a hardenable coatable composition in the form of a viscous fluid, and typically in the molten state. With the application of pressure, the coatable composition will extrude through the openings in the reinforcing fabric 14 and into the nonwoven web 12. In this manner, the molten polymer flows around and encapsulates fibers along the first major side 12a of the web 12. The polymer is then hardened in a known manner to form a reinforcing, thick, continuous polymer layer 16, forming an outer surface of the article. Preferably, the polymer is applied and hardened without significant penetration through the balance of the nonwoven web 12.

The hardened polymer layer 16 comprises a flexible low friction surface 17a coextensive with the reinforcing fabric and portions 17b which extend through the fabric 14 and are bonded to fibers of the web 12. The low friction back surface 17a of the finished article may be planar without protrusions or depressions therein. Alternatively, the surface 17a may be dimpled or otherwise textured to adapt the article to a particular end use. If desired, indicia may be applied to the surface 17a.

The polymer layer 16 is formed from a coatable composition applied to the web 12 and the fabric 14. The coatable composition may comprise liquid reactive components or a thermoplastic polymer material which has been sufficiently fluidized by heat, for example, and hardened to form the polymer layer 16, as described herein. Preferred are those polymers which will harden in situ, such as by curing, and will remain solid at room temperature. Curing of the composition can be accomplished in a known manner such as by heating in an oven, exposure to ultraviolet light, the use of peroxides and the like. Alternatively, thermoplastic polymers which solidify at room temperature can also be used.

The polymer layer may be within a fairly broad range of hardness values. Preferably the hardness will range from about Shore 50A to about Shore 80D and more preferably from about Shore 90A to about Shore 70D. It will be appreciated, however, that articles having polymer layers with hardness values outside of these ranges may be suitable for use in specific applications and the invention is not to be construed as limited to the foregoing hardness ranges. Materials softer than about Shore 90A may generate excessive friction and thermally degrade in certain applications, such as in those applications requiring the use of a stationary platen, for example. These softer materials, however, may be employed in belts applications which do not require the use of a stationary platen, such as on a backstand where there is limited relative motion between the back of the surface finishing article and the driving means employed. Materials harder than about Shore 70D may be excessively stiff and, therefore, will generally be unsuitable for use in the formation of endless belts. However, such articles may be useful in some surface finishing disc applications, for example.

The thickness of the polymer layer is preferably between about 0.175 mm and about 1.75 mm and more preferably between about 0.250 mm and about 1.0 mm. Polymer layers less than about 0.250 mm generally lack structural integrity and durability. Layers thicker than about 1.00 mm may be undesirably stiff for use in endless belts but may be suitable for at least some applications involving discs or pads. In general, a thickness greater than about 1.75 mm will make the article too stiff for most applications.

In selecting the polymer for the manufacture of the layer 16, consideration is given to the end use of the finished article, allowing for the required flexibility of the article and its conformability to the surface of the workpiece. An additional consideration in the formation of endless belts is the ability of the polymer to provide a low friction surface capable of withstanding significant heat buildup caused by the application of a stationary platen, for example. An article made without the ability to withstand the heat generated during use will experience a shortened useful life and may present a safety hazard.

Preferably, the polymer employed in the articles of the invention is a melt extruded polymer which may include compatible fillers, pigments, reinforcing fibers, antioxidants, lubricants and the like. Suitable melt extrudable polymers for use in the invention include thermoplastics such as nylons, polyesters, polypropylene, polyethylene/vinyl acetate copolymers, acrylic/butadiene/styrene copolymers and the like. Thermoplastic elastomers such as ionomers, polyesters, polyurethanes, polyamide ethers, and the like are also suitable melt extrudable polymers. The polymer layer can be formed from the polymerization of liquid reactants in the coatable composition described above and, useful reactive polymer systems include thermal or radiation cured urethane, polyester and epoxy resins. An example of a useful liquid reactive system for use in the invention is the two part laminate adhesive composition described in Example 1 of U.S. Pat. No. 4,331,453, incorporated herein by reference. The most preferred polymer is nylon 6, such as that which is commercially available under the trade designation "Ultramid" from BASF Corporation of Parsippany, N.J.

In endless belts, the polymer will preferably have a melting temperature greater than about 115° C. as measured by differential scanning calorimetry (DSC) according to the method described in ASTM 537-86. More preferred are those polymers having a melting temperature greater than about 150° C., especially when used in endless belts which will be subjected to high workpiece pressures. Materials having melting temperatures less than 115° C. may fail prematurely, especially in belt applications where a platen will be urged against the polymer at high pressures.

Method of Manufacture

Figure 4:
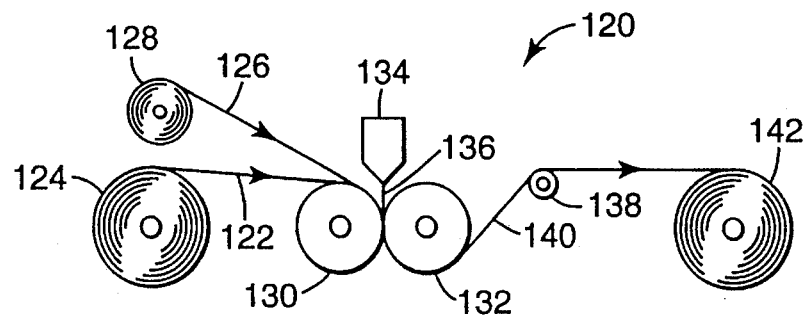
FIG. 4 is a schematic diagram depicting a method for manufacturing a surface finishing article according to the present invention.

Referring to FIG. 4, a preferred method for the manufacture of articles according to the invention is illustrated in schematic and will now be described. A lay-up 120 including a nonwoven web 122 is fed from a feed roll 124. The nonwoven 122 may be previously needle tacked, coated and hardened, as described herein. A reinforcing fabric 126 is fed from the feed roller 128 to a pair of counter rotating nip rolls 130 (laminating roll) and 132 (casting roll) where the nonwoven web 122 and the fabric 126 are joined to form a laminate. An extruding apparatus fitted with a film die 134 is positioned to apply a sheet of a coatable composition 136 into the nip so that the composition is applied to the outermost surface of the scrim 126.

The successive layers of the fabric 126, the coatable composition 136, and the nonwoven web 122 are passed between the rolls 130, 132 which shape the composition 136 by applying pressure to opposed sides of the aforementioned layers. The coatable composition 136 is thereby forced through the pores or openings within the scrim 126 and simultaneously smoothed over the outermost surface of scrim 126. Rotating roll 130 may be fitted with a removable surface sleeve (not shown) or it may be chrome plated or textured. Both rolls 130 and 132 are water cooled to a temperature sufficient to harden the composition 136 as it passes between the rolls 130, 132. Where the composition 136 is nylon 6, the temperature of the roller is typically about 16° C. Where a textured or matte finish is desired for the polymer layer, the roll 132 is coated with a textured material or is fitted with an appropriate sleeve to impart the desired finish.

In this manner, a continuous sheet 140 of surface finishing material is formed comprising the nonwoven web 122 and the scrim 126 bonded to one another by a hardened polymer layer. The polymer layer thus formed comprises a smooth low friction surface coextensive with the reinforcing fabric and portions extending through the fabric forming discrete bonding areas which encapsulate fibers in the nonwoven web 122. A roll 138 guides the continuous sheet 140 of surface finishing material to a take-up roll 142 from which the material 140 may subsequently be cut to form discs, pads, endless belts and the like.

It will be understood that the foregoing process can be modified and the invention is not to be construed as limited to the specific steps described above. The continuous material 140 may be fed directly from the nip rolls 130 and 132 to a cutting station (not shown) where the sheet 140 may be cut into finished articles. It is also contemplated that the film die 134 can be positioned to apply the coatable composition 136 between the nonwoven web 122 and the scrim 126. In such an embodiment, the pressure from the nip rolls 130 and 132 will be sufficient to force the molten polymer through the side of the fabric 126 adjacent the nonwoven web 122, first coating the nonwoven fibers with the composition 136 and forcing the composition through the openings in the fabric to form the smooth continuous low friction exposed surface of the article, as discussed above. Other modifications to the described process may be made while remaining within the contemplated scope of the invention.

The inventive features of the surface finishing articles and the manufacturing methods described herein are further demonstrated in the following Examples. All of the Examples are intended to be exemplary of embodiments of the invention and not limiting in any way.

EXAMPLES

Trade Designations

Certain ingredients are referred in the following Examples by their trade designations which shall be understood to have the meanings set forth below.

"Ultramid" is a trade designation for a nylon 6 polymer commercially available from BASF Corporation of Parsippany, N.J.

"Scotch-Brite" is a trade designation for a class of nonwoven materials commercially available from Minnesota Mining and Manufacturing Company of St. Paul, Minn.

"High Strength A-VFN" refers to a staple based nonwoven material including alumina abrasive particles (220–320 grit equivalent) available in various widths and lengths under the foregoing "Scotch-Brite" trade designation from Minnesota Mining and Manufacturing Company. This material comprises a non-needle tacked web of 13.5 denier nylon fiber which has been roll coated with a polyurethane binder over which a phenolic resin/alumina slurry has been applied and cured. The finished web weight for this material is about 774 g/m$^2$.

"Clean and Finish" is a trade designation for a "Scotch-Brite" nonwoven web, typically used in polishing applications and available from Minnesota Mining and Manufacturing Company. The "Type T" webs used herein were needle tacked webs of 6 denier polyester fiber which were coated with a polyurethane/talc composition and cured. The finished web weight for this material is about 523 g/m$^2$.

"Hi-Pro" is a trade designation for a continuous filament based nonwoven material commercially available from Minnesota Mining and Manufacturing Company of St. Paul, Minn. This material is a non-needle tacked web of nylon fibers (10 mil thickness). The fibers of the webs are coated with a urethane resin and abrasive particles (Alumina) are coated onto the urethane prior to curing. The finished web weight is about 1423 g/m$^2$.

"Adiprene BL-16" is a trade designation for a blocked polyfunctional isocyanate polymer from Uniroyal Chemical Company, Inc. of Middlebury, Conn.

"MAC 280" is a trade designation for an abrasive product commercially available from Hermes Abrasives, Ltd. of Germany. The product was used as a control in comparative testing and comprises a nonwoven web affixed to a cloth backing. Aluminum oxide is affixed to the nonwoven web.

Extrusion Conditions

The "Johnson Spartan" model 70 single screw extruder, obtained from Johnson Plastics Machinery Company, was used in the extrusion of the polymer layer in certain Examples, as indicated. The extruder was a 6.35 cm (2.5 inch) single screw extruder fitted with a 0.61 meter (24 inch) flex-lip film die with the lip gap set at 0.50 mm (0.020 inch). The extruder had five temperature control zones along the barrel which were set to provide five zone temperatures of 212°, 240°, 245°, 250° and 255° C. proceeding from the feed section to the metering section of the barrel. The film die also had five temperature zones across its width, all of which were set to provide a uniform temperature of 250° C. The extruder was operated at 21 rpm resulting in a current draw of 28 amperes, and a barrel pressure of 77.5 kg/cm$^2$ (1100 psi).

EXAMPLE 1

A surface finishing article was made having three identifiable layers comprising a nonwoven web of a continuous filament based abrasive ("Hi-Pro"; Minnesota Mining and Manufacturing Company); a reinforcing fabric consisting of 16×16 plain weave scrim cloth of 840 denier nylon 6,6 yarn and weighing about 149 g/m$^2$ (Highland Industries, Spartanburg, S.C.) and a polymer layer of nylon 6 polymer ("Ultramid", BASF Corporation). The nylon 6 polymer was introduced as a molten film processed from the single screw extruder which was set to provide a 265° C. polymer melt temperature. The die lip was positioned 5.1 cm (2 inches) above a pair of counter rotating nip rolls. The first roll was a 20.3 cm (8 inch) diameter chrome plated casting roll. The second roll (laminating roll) was of the same diameter as the first and was fitted with a smooth surfaced polytetrafluoroethylene coated sleeve roll cover (Available under the trade designation "Edlon HST-2" from Edlon Roll Coverings of Avondale, Pa.). Both rolls were water cooled by circulating chilled water therethrough to provide a surface temperature on each roll of 16° C. The coatable composition was a molten polymer film which was applied to the back surface of the scrim opposite the nonwoven web just ahead of the nip to provide a polymer film coating weight of about 504 g/m$^2$ and a molten layer of about 0.51 millimeters thick. The rolls were operated at a surface speed of 1.3 meters per minute. The three layers were pressed together between the two rolls at a pressure of about 5.98 kg/cm$^2$ (85 psi) and the polymer was cooled and hardened upon exposure to the chilled casting roll to provide a finished article.

EXAMPLE 2

A surface finishing article was made as in Example 1 except that the molten polymer layer was about 0.89 mm thick. The increased thickness of the polymer was achieved by slowing the speed of the chrome plated casting roll from a surface speed of 1.3 meters per minute to 0.65 meters per minute to allow a thicker molten layer to accumulate on the scrim backing prior to compressing the layers between the rollers.

An inspection of the articles of the above Examples 1 and 2 was conducted by visual inspection and by attempting to manually delaminate the layers thereof. Any adhesive delamination was considered unacceptable. The reinforcing fabric and the polymer layer in the article of Example 1 were partially pulled apart by hand, indicating that the thinner polymer layer in this article provided inadequate bonding. The article of Example 2, however, with its thicker polymer layer could not be pulled apart and was, therefore, considered to be acceptable for use in surface finishing applications.

EXAMPLE 3

A surface finishing article was prepared comprising a nonwoven web ("Scotch-Brite" High Strength A-VFN, Minnesota Mining and Manufacturing Company), and a reinforcing fabric consisting of a 16×16 nylon scrim (as in Example 1). The two layers were stacked together and a layer of nylon 6 ("Ultramid", BASF Corporation) was applied to the scrim side of the stack by extrusion as in Example 1. The extruder was set to produce a polymer melt temperature of 260°. The chrome plated casting roll was rotated at a surface speed of 1.2 m/min with the resulting molten polymer layer deposited onto the scrim with a thickness of about 0.55 mm. The three layers were consolidated by passing them between the two nip rollers at between 0.11 and 0.32 kg/cm$^2$ (1.6 and 4.6 psi). The resulting surface finishing article was visually inspected and manual delamination of the layers was attempted. The article was judged to be well bonded, flexible, and had a smooth, planar polymer surface.

EXAMPLE 4

Another surface finishing article was made according to the procedure of Example 3 with the exception that the chrome plated casting roll was replaced with a textured roll (plasma coating #915, 0.006" thick, 225±50 rms, hardness 58 $R_c$ commercially available from Plasma Coatings, Inc. of Waterbury, Conn.) to create an exterior polymeric layer surface with a matte finish. Inspection of the finished article confirmed that it was well bonded and flexible.

EXAMPLE 5

A surface finishing article was manufactured by first mixing 72.2 grams of a blocked polyfunctional isocyanate polymer ("Adiprene BL-16", Uniroyal Chemical Company, Inc.) with 31.2 grams of a 35% solution of methylene dianiline (MDA) (available from BASF Corporation, Germany) in 2-ethoxyethanol acetate ("Arcosol PM Acetate" from Arco Chemical, Houston, Tex.). A 0.08 mm (0.003 inch) film of polyethylene terephthalate (PET) was coated with a 3% solution of poly(vinylalcohol) (PVA) in isopropanol (commercially available under the trade designation "Partall" No. 10, Worum Chemical Co., St. Paul, Minn.) by brushing an even coating of the solution over the film with a paint brush. The PVA solution served as a release agent. The solution was allowed to dry on the film overnight at ambient conditions. Approximately half of the polyisocyanate/polyamine mixture was poured onto the coated film and distributed over its surface. A cut section of 16×16 nylon 6,6 scrim cloth was pressed by hand into the polymer mix. The polymer mix readily extruded through the openings in the scrim with the application of moderate force. A cut section of nonwoven web material ("Scotch-Brite" High Strength A-VFN, Minnesota Mining and Manufacturing Company) was applied to the scrim and the composite article was cured in a convection oven at 121° C. for 45 minutes. After cooling at ambient conditions the composite article was removed from the PET film and inspected by visual examination and by attempting to manually delaminate the layers of the finished article. The polymeric layer had successfully bonded all of the layers in the article and, the article was judged as a useful surface finishing article.

EXAMPLE 6

Another article was made as in Example 5, except that two layers of the scrim cloth were placed onto the polymer film prior to adding the nonwoven layer. The resulting article was well bonded and was judged to be suitable for surface finishing applications.

EXAMPLE 7

Another article was made according to Example 5 except a two-part unsaturated polyester casting resin was used in place of the polyisocyanate/polyamine mixture. The polymer resin was commercially available under the trade designation "Castin Craft Clear Liquid Casting Resin and Catalyst" from ETI of Fields Landing, Calif. The polymer was cured at ambient conditions. An inspection of the resulting article indicated that it was well bonded and suitable for surface finishing applications.

CONTROL EXAMPLE A

A surface finishing article was made as in Example 3 except that the woven stretch-resistant reinforcing material was omitted. The resulting article was used as a control in the comparative testing below.

TEAR TESTING

Comparative testing was conducted for the inventive article of Example 3 and Control Example A. 6.35×27.9 cm (2.5×11 inch) test specimens were cut from the articles of the foregoing Examples. The specimens were then tested for tear strengths according to the standard Elmendorf Tear Test with a 6400 gram pendulum as described in ASTM Test Method D-1424. The data is set forth in Table 1.

TABLE 1

| Surface finishing Article | Tear Strength (g force) |
|---|---|
| Control A (cross direction) | >6400[1] |
| Control A (machine direction) | >6400 |
| Example 3 (cross direction) | no tear |
| Example 3 (machine direction) | no tear |

[1]Indicates that the sample experienced tearing at a force beyond the limits of the test apparatus.

The above data indicate that the sample of the invention has greater tear resistance than the control, thus indicating the additional strength given to the articles of the invention by the inclusion of a porous reinforcing fabric combined with a polymer layer comprising a flexible low friction surface and portions extending through the fabric and encapsulating fibers of the web.

STRETCH TESTING

Stretch testing was conducted for comparison of the inventive article of Example 3 and Control Example A. Two test specimens were prepared, one for the Example and one for Control A, each measuring approximately 2.5×17.8 cm (1×7 inch). Each of the specimens was mounted in a Sintech Tensile Tester (available from MTS Systems of Minneapolis, Minn.). The initial gauge was 12.7 cm (5 inch) and a 90.7 kg (200 pound) full-scale load cell was employed. The crosshead speed was set to separate at 1 inch per minute. The specimens were pulled until a load of 45.4 kg (100 pounds) was achieved. Both absolute and relative elongations were measured and the results of those measurements are set forth in Table 2.

TABLE 2

| Specimen | Elongation at 45.4 kg. (cm) | % stretch at 45.4 kg |
|---|---|---|
| Control A | 4.1[1] | 32[1] |
| Example 3 | 1.52 | 12 |

[1]Specimens broke at a load of 38.6 kg (85 lb).

The results in Table 2 establish that low stretch values are obtained by articles of the invention. The control article experienced significant elongation and stretch before breaking at the load of only 38.6 kg (85 pounds). The inventive article of Example 3 had less elongation and stretch and was able to easily withstand 45.4 kg (100 pounds) of load without breaking.

FRICTION TESTING

A determination of the coefficients of static and kinetic friction was made for the inventive articles of Examples 3 and 4 and for a control ("MAG 280", from Hermes Abrasives, Ltd. of Germany). The control (hereafter "Control Example B") comprised a synthetic web coated with aluminum oxide abrasive and affixed to a cloth backing. Specimens measuring 11.4×11.4 cm (4.5×4.5 inch) were cut from the articles of the Examples 3 and 4 and from Control Example B. Test method ASTM 1894-90, "Static and Kinetic Coefficients of Friction of Plastic Film and Sheeting", was followed. The comparative data is set forth in Table 3.

TABLE 3

| Specimen | Coefficient of friction (static) | Coefficient of friction (kinetic) |
| --- | --- | --- |
| Example 3 | 0.180 | 0.094 |
| Example 4 | 0.271 | 0.226 |
| Control B | 0.495 | 0.402 |

The results shown in Table 3 show a desired lower coefficient of friction for articles of the invention as compared with the control which lacked a polymer backing. The article of Example 4 gave test values slightly higher than those for the article of Example 3, illustrating that a matte finish on the polymer layer like that of Example 4 will experience more friction in those belt applications requiring the use of a platen. The coefficients of friction for Example 4, however, are still lower than those for Control B and are acceptable.

EXAMPLE 8

A surface finishing article was prepared comprising a nonwoven web having a thickness of about 9 mm (0.35 inch) ("Scotch-Brite" "Clean and Finish" roll, Type T, Minnesota Mining and Manufacturing Company), and a reinforcing fabric consisting of 16—16 nylon scrim (as in Example 1). The two layers were stacked together and a layer of nylon 6 ("Ultramid", BASF Corporation) was applied to the scrim side of the stack by extrusion, as in Example 1. The extruder was set to produce a polymer melt temperature of 260° C. The casting roll was rotated at a surface speed of 1.2 m/min resulting in a layer of molten polymer about 0.55 mm thick. The three layers were consolidated by passing them between the counter rotating nip rollers which applied pressures of between 0.11 and 0.32 kg/cm$^2$ (1.6 and 4.6 psi). The chrome plated casting roll was replaced with a textured roll (plasma coating #915, 0.006" thick, 225±50 rms, hardness 58 $R_c$ commercially available from Plasma Coatings, Inc. of Waterbury, Conn.) to provide a matte finish to the polymer layer. The resulting composite article was well bonded and flexible. The article was cut to a strip measuring 12.7 cm×6.55 m (5 in.×258 in.) and made into an endless belt by conventional butt splicing.

The belt of Example 8 was comparatively tested in a polishing application against a commercially available nonwoven surface finishing belt product ("Scotch-Brite" surface conditioning FB belt, Type T, from Minnesota Mining and Manufacturing Company, hereinafter "Control Example C"). The Control C comprised a nonwoven web which had been needle tacked into a scrim backing. The fibers of the web were coated with a nonabrasive polyurethane coating. A nylon 6 layer coated the back of the scrim and encapsulated the needled fibers protruding through the scrim. The polymer provided a smooth surface for the application of a platen thereagainst. The belt of Example 8 was mounted on a stroke sander having driving and driven contact wheels, a support table and a hand platen used to urge the belt against the workpiece. A standard polishing compound was applied to the working surface of the belt and, using the platen, the rotating belt was urged against a surface on a wooden piano cabinet finished with a lacquer topcoat for a period of about two minutes. The treated wood was then inspected for scratches. Control C was identically tested.

A visual inspection and comparison of the surfaces polished with the foregoing belts revealed deep scratches in the surface treated with the needle tacked Control C. The belt of Example 8, however, provided a finished surface with no objectionable scratches in the lacquer.

The preferred embodiment of the invention has now been discussed and described in some detail. Those skilled in the art will appreciate that various changes and modifications to the described embodiment can be made without departing from the true spirit and scope of the invention, as defined in the following claims.

We claim:

1. A surface finishing article, comprising:
   a nonwoven three dimensional lofty web of fibers having at least one major surface, said fibers bonded to one another at their points of mutual contact;
   a stretch resistant porous reinforcing fabric having first and second major surfaces, said first major surface of said fabric disposed on and along said one major surface of said nonwoven web;
   a layer comprising a flexible polymer coated over and coextensive with said second major surface of said fabric, said layer having a low friction exposed surface and portions extending through said reinforcing fabric encapsulating fibers along said one major surface of said web.

2. The surface finishing article as defined in claim 1 wherein said fibers of said web are bonded together at their mutual contact points with an adhesive binder.

3. The surface finishing article as defined in claim 2 wherein said binder is a resinous thermosetting adhesive selected from the group consisting of phenolic resins, aminoplast resins having pendant α, β-unsaturated carbonyl groups, urethane resins, epoxy resins, ethylenically unsaturated resins, acrylated isocyanurate resins, urea-formaldehyde resins, isocyanurate resins, acrylated urethane resins, acrylated epoxy resins, bismaleimide resins, fluorine-modified epoxy resins, and combinations thereof.

4. The surface finishing article as defined in claim 3 wherein said binder further comprises abrasive particles selected from the group consisting of aluminum oxide, silicon carbide, alumina zirconia, diamond, ceria, cubic boron nitride, garnet, and combinations thereof.

5. The surface finishing article as defined in claim 4 wherein said aluminum oxide is selected from the group consisting of ceramic aluminum oxide, heat-treated aluminum oxide, white-fused aluminum oxide and combinations thereof.

6. The surface finishing article as defined in claim 1 wherein said fabric is a material selected from the group consisting of woven fabric, thermobonded fabric, knitted fabric and stitch-bonded fabric.

7. The surface finishing article as defined in claim 6 wherein said fabric includes a plurality of openings therein of about 0.10 mm$^2$.

8. The surface finishing article as defined in claim 6 wherein said woven material comprises nylon 6,6 yarn and having 16 warp yarns and 16 fill yarns per inch, said yarns having a denier of about 840 denier and said fabric having a weight of about 149 g/m$^2$.

9. The surface finishing article as defined in claim 1 wherein said fabric has a stretch value of less than about 20%.

10. The surface finishing article as defined in claim 1 wherein said polymer has a hardness from about Shore 50 A to about Shore 80 D and a thickness between about 0.175 mm and about 1.75 mm.

11. The surface finishing article as defined in claim 10 wherein said polymer is a melt extrudable thermoplastic material selected from the group consisting of polyamide, polyester, polypropylene, polyethylene/vinyl acetate copolymer, acrylic/butadiene/styrene copolymer, ionomer, polyurethane, polyamide ether, and combinations thereof.

12. The surface finishing article as defined in claim 11 wherein said polyamide is nylon 6.

13. The surface finishing article as defined in claim 1 wherein said polymer is a cured resin selected from the group consisting of polyurethane, polyester, epoxy resin and combinations thereof.

14. A method for the manufacture of a surface finishing article, comprising:

positioning a porous stretch resistant reinforcing fabric having first and second major surfaces adjacent one major surface of a nonwoven three dimensional lofty web of fibers such that said first major surface of said fabric substantially covers said one major surface of said web;

applying a coatable composition so that a portion of said composition extends through said fabric to contact and encapsulate fibers along said one major surface of said web adjacent said first major surface of said fabric while forming a coating having an exposed surface over and coextensive with said second major surface of said fabric; and hardening said coatable composition to provide said surface finishing article.

15. The method as defined in claim 14 wherein said fibers of said web are banded together by a resinous thermosetting adhesive, said adhesive selected from the group consisting of phenolic resins, aminoplast resins having pendant $\alpha$, $\beta$-unsaturated carbonyl groups, urethane resins, epoxy resins, ethylenically unsaturated resins, acrylated isocyanurate resins, urea-formaldehyde resins, isocyanurate resins, acrylated urethane resins, acrylated epoxy resins, bismaleimide resins, fluorine-modified epoxy resins, and combinations thereof.

16. The method as defined in claim 15 wherein said adhesive resin includes abrasive particles dispersed therewithin, said abrasive particles selected from the group consisting of aluminum oxide, silicon carbide, alumina zirconia, diamond, ceria, cubic boron nitride, garnet, and combinations thereof.

17. The method as defined in claim 14 wherein said fabric is a material selected from the group consisting of woven fabric, thermobonded fabric, knitted fabric and stitchbonded fabric.

18. The method as defined in claim 17 wherein said woven material comprises nylon 6,6 yarn and having 16 warp yarns and 16 fill yarns per inch, said yarns having a denier of about 840 denier and said fabric having a weight of about 149 g/m$^2$.

19. The method as defined in claim 17 wherein said fabric includes a plurality of openings of about 0.10 mm$^2$.

20. The method as defined in claim 14 wherein said applying further comprises placing said composition onto said second major surface of said fabric, and forcing a portion of said composition through said fabric to encapsulate said fibers along said one major surface of said web while simultaneously smoothing the remainder of said composition over said second major surface of said fabric to form said exposed surface.

21. The method as defined in claim 20 wherein said forcing and said smoothing are accomplished by arranging said web, said fabric and said composition into succesive layers and passing said layers between counter rotating rolls, at least one of said rolls having a surface configured to smooth said remainder of said composition, said rolls forcing said composition through said fabric.

22. The method as defined in claim 21 wherein said hardening comprises chilling said nip roll to a temperature sufficient to cool and harden said composition as said layers pass between said rolls.

23. The method as defined in claim 14 wherein said applying comprises placing said composition between said first major surface of said fabric and said one major surface of said web to encapsulate said fibers along said one major surface of said web while simultaneously forcing a portion of said composition through said fabric to said second major surface of said fabric and smoothing said composition over said second major surface to form said exposed surface.

24. The method as defined in claim 23 wherein said forcing and said smoothing are accomplished by arranging said web, said fabric and said composition into succesive layers and passing said layers between counter rotating rolls at least one of said rolls having a surface which is configured to smooth the remainder of said composition, said rolls applying pressure to said layers to force said composition through said fabric and smoothing said remainder over said second major surface.

25. The method as defined in claim 24 wherein said hardening comprises chilling said nip rollers to a temperature sufficient to cool and harden said composition as said layers pass between said rolls.

26. The method as defined in claim 14 wherein said composition is a thermoplastic material selected from the group consisting of polyamide, polyester, polypropylene, polyethylene/vinyl acetate copolymer, acrylic/butadiene/styrene, ionomers, polyurethane, polyamide ether, and combinations thereof.

27. The method as defined in claim 26 wherein said polyamide is nylon 6.

* * * * *